United States Patent [19]

McCoy

[11] 4,107,118
[45] Aug. 15, 1978

[54] SIZE COMPOSITION

[75] Inventor: Richard Alan McCoy, Gahanna, Ohio

[73] Assignee: Owens-Corning Fiberglas Corporation, Toledo, Ohio

[21] Appl. No.: 680,312

[22] Filed: Apr. 26, 1976

[51] Int. Cl.² ............................................. C08L 63/02
[52] U.S. Cl. ........................ 260/29.2 EP; 260/18 EP; 260/18 S; 260/29.2 N; 260/29.2 E; 260/29.6 NR; 260/836
[58] Field of Search ................. 260/29.2 EP, 47 EP, 260/29.6 NR

[56] References Cited

U.S. PATENT DOCUMENTS

| | | | |
|---|---|---|---|
| 2,946,701 | 7/1960 | Plueddemann | 260/29.2 EP X |
| 2,974,062 | 3/1961 | Collier | 260/29.2 EP X |
| 3,169,884 | 2/1965 | Marzocchi et al. | 260/29.2 EP X |
| 3,207,623 | 9/1965 | Marzocchi et al. | 260/29.2 EP X |
| 3,211,684 | 10/1965 | Eakins | 260/29.2 EP |
| 3,297,519 | 1/1967 | Rambosek | 162/164 |
| 3,297,622 | 1/1967 | Grosner et al. | 260/29.7 |
| 3,346,519 | 10/1967 | Williams | 260/9 |
| 3,370,969 | 2/1968 | Powell et al. | 106/131 |
| 3,371,052 | 2/1968 | Hirshfeld | 260/2 |
| 3,437,517 | 4/1969 | Eilerman et al. | 260/29.2 EP X |
| 3,441,435 | 4/1969 | Kirschnek et al. | 260/29.2 EP X |
| 3,888,812 | 6/1975 | Plettner | 260/24 |
| 3,914,192 | 10/1975 | Flautt et al. | 260/4 R |

*Primary Examiner*—Thomas De Benedictis
*Attorney, Agent, or Firm*—John W. Overman; Philip R. Cloutier; Ronald C. Hudgens

[57] ABSTRACT

A glass size composition comprising an epoxy resin emulsion, a polyvinylpyrrolidone and a polyethylene glycol ester mono oleate is particularly suitable for use in epoxy resin filament winding.

4 Claims, No Drawings

SIZE COMPOSITION

This invention pertains to a glass size composition.

In one of its more specific aspects, this invention pertains to an epoxy-compatible glass size composition particularly suitable for filament winding.

The use of glass fibers in filament winding is well known. Generally, the glass is sized with a material which is compatible with the resin. However, it is also desirable that the size perform well in the roving operation particularly when applied to softer glass which tends to fuzz during roving and that the size enable the glass to contribute consistant, high strength to the laminate into which it is incorporated. The size composition of this invention satisfies these requirements particularly when applied to "S" glass.

The size composition of this invention can be applied to glass fibers by any conventional manner employing conventional applications. The glass can be dried by conventional procedures in the form of individual fibrils, roving, or the like and accumulated into packages of any size.

Preferably, the size will be applied to a 2/G150 sliver of "S" glass to a strand solids within the range of 0.90 to about 1 weight percent, the slivers gathered as roving and the packages dried for about 13 to about 15 hours at about 235° F.

According to this invention there is provided an aqueous glass size composition comprising an epoxy resin emulsion, a silane coupling agent, a polyvinylpyrolidone and a polyethylene glycol ester mono oleate. In its preferred form, the size composition will comprise deionized water.

Also, according to this invention there is provided a glass fiber having at least a portion of its surface in contact with a residue produced by the removal of water of the previously-described aqueous glass size composition.

The aqueous size composition will contain from about 5 to about 11 weight percent of an epoxy resin emulsion. In its preferred form, the size composition will contain about 8.7 weight percent of the epoxy resin emulsion.

This epoxy resin emulsion is based upon an intermediate epoxide equivalent weight bisphenol-A semi-solid epoxy resin.

This emulsion is produced for the purpose of producing 100 pounds of the emulsion, by introducing into a mix tank about 3.5 pounds of a first condensate of ethylene oxide with hydrophobic bases formed by condensing propylene oxide with propylene glycol. One suitable condensate is Pluronic L101 available from BASF Wyandotte, Industrial Chemical Group, Wyandotte, Michigan.

To the mix tank is then added about 7.2 pounds of xylene and about 14 pounds of acetone-free diacetone alcohol. The temperature of the contents of the mix tank is raised to about 110° F at which temperature about 10.6 pounds of a second condensate of ethylene oxide with hydrophobic bases formed by condensing propylene oxide with propylene glycol is added.

One suitable second condensate is Pluronic P105 available from BASF Wyandotte, Industrial Chemical Group, Wyandotte, Michigan.

The contents of the mix tank is then raised to about 175° F at which temperature an epoxy resin is added in an amount of about 64.5 pounds.

Any suitable epoxy resin can be used. Preferably, the epoxy resin will be the reaction product of epichlorohydrin and bisphenol-A, this reaction product having the general structure:

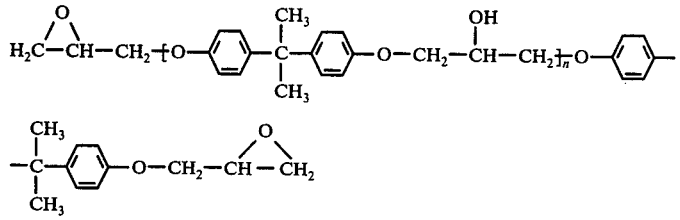

wherein $n$ has a value of less than 7 but such that the resin exists as a solid having an epoxide equivalent weight of between about 575 and about 700, a softening point between about 80 and about 90 and a specific gravity of about 1.19.

Such a material is available as D.E.R. 662 from the Dow Chemical Company, Midland, Michigan.

After all the epoxy resin has been added, agitation is continued while the contents of the mix tank are cooled to about 150° F. At this temperature about 3.5 pounds of water are added at the rate of about 0.5 pounds per minute. Cooling and agitation are continued until the temperature of the mix tank reaches about 125° F at which temperature the resin emulsion is maintained for about 5 minutes.

The resulting emulsion, prepared as described above, shall be referred to hereinafter as the "epoxy resin emulsion".

The glass size composition will contain from about 0.4 to about 1.4 weight percent of a silane coupling agent. In its preferred embodiment, this silane will be g-glycidoxypropyltrimethoxysilane which will be contained in the size in an amount of about 1.1 weight percent.

Suitable silanes include A-187 available from Union Carbide Corporation, New York, N.Y. and Z6040 from Dow Corning, Midland, Michigan.

The size composition will also contain a polyvinylpyrrolidone in an amount within the range of from about 0.2 to about 1.5 weight percent. In its preferred form, the polyvinylpyrrolidone will be contained in an amount of about 1 weight percent.

Any suitable polyvinylpyrrolidone can be employed. Preferably, the polyvinylpyrrolidone will have a number average molecular weight of about 360,000 and a viscosity corresponding to PVP K-90 under which grade it is commercially available from several suppliers in the United States. (See Encyclopedia of Chemical Technology, Vol. 21, 2nd ed., John Wiley & Sons, Inc., 1970).

The aqueous size composition will also contain a polyethylene glycol mono oleate in an amount within the range of from about 0.2 to about 1.5 weight percent.

In its preferred embodiment, the aqueous size composition will contain the polyethylene glycol mono oleate in an amount of about 0.76 weight percent. Preferably, this polyethylene glycol mono oleate will have a weight molecular weight of about 680 and a viscosity of about 110 cps, an acid number of about 1 and a hydroxyl number of about 87.

Suitable polyethylene glycol mono oleates are PEG-400 M. O. from Ethox Chemicals, Inc., Greenville, S.C., Emerset 2645 from Trylon Chemicals, Inc., Maulden, S.C. and Pegosperse 400 M.O. from Glyco Chemicals, Inc., Greenwich, Conn.

The aqueous composition will also contain a lubricant in an amount within the range of from about 0.02 to about 0.2 weight percent, preferably in an amount of about 0.038 weight percent. Any suitable lubricant can be employed including partial amides such as Emery 6717 as supplied by Trylon Chemicals, Co., Maulden, S.C.

The following example demonstrates the preparation of a 50 gallon quantity of the size composition of this invention.

EXAMPLE I

Into a main mix tank are introduced about 10 gallons of water. Thereinto is introduced about 36.2 pounds of the epoxy resin emulsion. The resulting mixture is agitated for about 15 minutes.

Into a first premix tank are introduced about 10 gallons of deionized water. About 4.75 pounds of the silane are introduced into the premix tank and the resulting solution is agitated for about 15 minutes until the solution is clear. The resulting composite is introduced into the main mix tank.

Into a second mix tank are introduced about 10 gallons of deionized water at a temperature of about 150°–160° F. A small guantity of this water is added to a container containing about 0.15 pound of the lubricant. About 0.015 pound of the acetic acid is introduced into the lubricant-water composite and the total composite is stirred until the lubricant is dissolved.

There is introduced about 1 gallon of the water at 150°–160° F into a container containing about 4.3 pounds of the polyvinylpyrrolidone. The resulting composite is stirred until dissolved.

The acetic acid-containing composite and the polyvinylpyrrolidone-containing composite are then both introduced into the water at 150°–160° F.

To the resulting composite are then introduced about 3.2 pounds of the polyethylene glycol mono oleate. The resulting composite is agitated and thereafter added to the main mix tank to produce the size composition of this invention which should have a pH within the range of from about 5 to 8 and a solids content of about 5.5 weight percent.

Glass strands sized with this size composition can be dried for about 15 hours at 235° F indirect or direct gas-fired oven to produce sized glass fibers having a strand solids of about 0.95%, nominal.

The following example demonstrates the properties of glass sized with the size composition of this invention.

EXAMPLE II

The size composition of this invention was applied to a 2/G150 silver of S glass at 0.90 to 1.0% strand solids. The sized glass was dried for 13–15 hours at 235° F.

Roving was made from the sized fibers and evaluated in Navy Ordinance Lab ring shear tests (anhydrideepoxy resin) with the following results. Average results are given for an anhydride-epoxy resin having about 55 + 5% glass volume.

| | |
|---|---|
| Dry Strength, $10^3$ psi | 9.53 |
| 6 Hr. Boil, $10^3$ psi | 9.44 |
| Rings/ condition | 7 |
| Total Sample/Condition | 49 |
| LOI Range, Approx. | 28.7 – 30.5 |
| Strand Tensile, $10^3$ psi | 526 |

The above data indicate the decidedly superior effectiveness of the glass sizing composition of this invention when applied to glass fibers employed for the purpose of enforcing epoxy resins.

It will be evident from the foregoing that various modifications can be made to this invention. Such, however, are considered as being within the scope of the invention.

What is claimed is:

1. An aqueous composition consisting essentially of an epoxy resin emulsion, a polyvinylpyrrolidone and a polyethylene glycol ester mono oleate.

2. The aqueous composition of claim 1 in which said composition consists essentially of said epoxy resin emulsion in an amount within the range of from about 5 to about 11 weight percent, said polyvinylpyrrolidone in an amount within the range of from about .2 to about 1.5 weight percent and said polyethylene glycol ester mono oleate in an amount within the range from about .2 to about 1.5 weight percent.

3. The aqueous composition of claim 1 wherein said composition consists essentially of said epoxy resin emulsion in an amount of about 8.7 weight percent, said polyvinylpyrrolidone in an amount of about 1 weight percent and said polyethylene glycol ester mono oleate in an amount of about 0.76 weight percent.

4. The aqueous composition of claim 1 wherein said epoxy resin of said emulsion consists essentially of the reaction product of epichlorohydrin and bisphenol-A, said reaction product has an epoxide equivalent weight within the range of from about 575 and about 700 and said polyvinylpyrrolidone has a number average molecular weight of about 360,000.

* * * * *